United States Patent
Eling et al.

(10) Patent No.: US 9,567,500 B2
(45) Date of Patent: Feb. 14, 2017

(54) HYDROPHOBIC POLYURETHANE ADHESIVE

(71) Applicant: BASF SE, Ludwigshafen (DE)

(72) Inventors: Berend Eling, Lemfoerde (DE);
Hans-Juergen Reese, Holdorf (DE);
Christian Koenig, Mannheim (DE);
Patrick Bolze, Osnabrueck (DE)

(73) Assignee: VASF SE, Ludwigshafen (DE)

( * ) Notice: Subject to any disclaimer, the term of this patent is extended or adjusted under 35 U.S.C. 154(b) by 0 days.

(21) Appl. No.: 14/901,138

(22) PCT Filed: Jun. 16, 2014

(86) PCT No.: PCT/EP2014/062493
§ 371 (c)(1),
(2) Date: Dec. 28, 2015

(87) PCT Pub. No.: WO2014/206779
PCT Pub. Date: Dec. 31, 2014

(65) Prior Publication Data
US 2016/0137892 A1    May 19, 2016

(30) Foreign Application Priority Data
Jun. 25, 2013 (EP) .................. 13173574

(51) Int. Cl.
| | | |
|---|---|---|
| C09J 175/08 | (2006.01) | |
| C09J 5/00 | (2006.01) | |
| C09J 7/02 | (2006.01) | |
| C08G 18/32 | (2006.01) | |
| C09J 175/06 | (2006.01) | |
| C09J 175/04 | (2006.01) | |
| C08G 18/48 | (2006.01) | |
| C08G 18/36 | (2006.01) | |

(52) U.S. Cl.
CPC .......... *C09J 175/08* (2013.01); *C08G 18/3206* (2013.01); *C08G 18/3215* (2013.01); *C08G 18/36* (2013.01); *C08G 18/4891* (2013.01); *C09J 5/00* (2013.01); *C09J 7/0282* (2013.01); *C09J 175/04* (2013.01); *C09J 175/06* (2013.01); *C09J 2463/006* (2013.01); *C09J 2475/00* (2013.01)

(58) Field of Classification Search
IPC .............. C08G 18/3215,18/4891, 18/3206, C08G 18/36; C08J 5/00, 7/0282, 175/06, 175/04, 2463/006, 2475/00
See application file for complete search history.

(56) References Cited

U.S. PATENT DOCUMENTS

| | | |
|---|---|---|
| 2008/0114086 A1 | 5/2008 | Lorenz et al. |
| 2009/0035506 A1 | 2/2009 | Pind et al. |
| 2013/0190418 A1 | 7/2013 | Kunst et al. |
| 2013/0231410 A1 | 9/2013 | Jacobmeier et al. |
| 2013/0231413 A1 | 9/2013 | Kunst et al. |
| 2013/0288060 A1 | 10/2013 | Pind et al. |
| 2014/0094531 A1 | 4/2014 | Kampf et al. |
| 2014/0200327 A1 | 7/2014 | Koch et al. |

FOREIGN PATENT DOCUMENTS

| | | |
|---|---|---|
| DE | 19812174 A1 * | 9/1999 |
| EP | 1 923 417 A1 | 5/2008 |
| EP | 1 997 616 A1 | 12/2008 |
| EP | 2 468 789 A1 | 6/2012 |
| WO | WO 2006/084900 A2 | 8/2006 |
| WO | WO 2009/080740 A1 | 7/2009 |

OTHER PUBLICATIONS

International Search Report and Written Opinion issued Jul. 28, 2014 in PCT/EP2014/062493 (with partial English translation).
"Rohstoffe" Polyurethane, vol. 7, 1993, pp. 57-75 (with Cover Page).
"Rohstoffe" Polyurethane, vol. 7, 1993, pp. 111-112 (with Cover Page).
Jacquin Wilford-Brown, "Introduction to coatings, adhesives, sealants and encapsulants" The Polyurethanes Book, 2002, pp. 347-361 (with Cover Page).
Berend Eling, "Adhesives" The Polyurethanes Book, 2002, pp. 379-394 (with Cover Page).

* cited by examiner

*Primary Examiner* — Rabon Sergent
(74) *Attorney, Agent, or Firm* — Oblon, McClelland, Maier & Neustadt, L.L.P.

(57) ABSTRACT

The present invention relates to a polyurethane adhesive comprising an isocyanate component A and a polyol component B where the isocyanate component A comprises at least one diisocyanate or polyisocyanate and the polyol component B comprises the alkoxylation product of a mixture of castor oil or ricinoleic acid (i), of an aromatic di- or polyol (ii), and of an OH-functional compound having aliphatically bonded OH groups and OH-functionality of from 1 to 8 (iii), and also optionally of a compound (iv), selected from the group consisting of cyclic anhydrides of dicarboxylic acids, and optionally of a compound (v) selected from the group consisting of cyclic mono- or diesters. The present invention further relates to a process for adhesive bonding with use of the polyurethane adhesive of the invention, to an item adhesive-bonded with the use of the polyurethane adhesive, and to the use of said item in the construction of wind turbines.

17 Claims, No Drawings

HYDROPHOBIC POLYURETHANE ADHESIVE

The present invention relates to a polyurethane adhesive comprising an isocyanate component A and a polyol component B where the isocyanate component A comprises at least one diisocyanate or polyisocyanate and the polyol component B comprises the alkoxylation product of a mixture of castor oil or ricinoleic acid (i), of an aromatic di- or polyol (ii), and of an OH-functional compound having aliphatically bonded OH groups and OH-functionality of from 1 to 8 (iii), and also optionally of a compound (iv), selected from the group consisting of cyclic anhydrides of dicarboxylic acids, and optionally of a compound (v) selected from the group consisting of cyclic mono- or diesters. The present invention further relates to a process for adhesive bonding with use of the polyurethane adhesive of the invention, to an item adhesive-bonded with the use of the polyurethane adhesive, and to the use of said item in the construction of wind turbines.

Polyurethane adhesives based on an isocyanate component and on a polyol component, known as two-component polyurethane adhesives, are known and are used by way of example in the adhesive bonding of plastics. These polyurethane adhesives are subject to stringent strength and adhesion requirements in particular when they are used as structural adhesives, i.e. when load-bearing structures require adhesive bonding. High strength values are obtained by way of high crosslinking densities, which are usually achieved by using relatively high functionalities in isocyanates and compounds reactive toward isocyanates.

Examples of load-bearing structures of this type are adhesive-bonded fiber-reinforced components for wings or other components of aircraft, adhesive-bonded fiber-reinforced components of boats, and in particular adhesive-bonded fiber-reinforced components for the production of blades for wind turbines.

WO 2006/084900 A2 discloses a two-component polyurethane composition which uses a mixture of at least one alkoxylated aromatic diol and of at least one aliphatic triol, and of a polyisocyanate component comprising at least one polyisocyanate.

A requirement in particular in the production of large-surface-area sandwich structures, for example in the production of blades for wind turbines, is that the adhesives remain usable for a long period after the polyol component and the isocyanate component have been mixed. In order to avoid side reactions of the isocyanate, for example with atmospheric moisture, which reduces open time and impairs the mechanical properties of the hardened adhesive, the adhesives are formulated with hydrophobic components so as to prevent the adhesive composition from absorbing water from the air, and thus to suppress these side reactions.

WO 2009080740 discloses a two-component polyurethane adhesive composed of an isocyanate component and of a polyol component, where the polyol component comprises a high-molecular-weight polyesterdiol, a high-functionality polyol, and also hydrophobic polyols, preferably selected from polycarbonate polyols, polybutadiene polyols, or oleochemical polyols, a particular example being castor oil.

A disadvantage, despite hydrophobic properties, is that adhesion is still inadequate, and also that use of polyesterdiols reduces chemicals resistance in particular under alkaline conditions. Another disadvantage of the solution in WO 2009/080740 A1 is that the composition proposed cannot achieve the high strength values and high modulus of elasticity values required for adhesive bonds in numerous applications.

EP 2468789 discloses a two-component polyurethane adhesive where the polyol component comprises castor oil, at least one aromatic diol and at least one polyol having from 5 to 8 hydroxy groups.

The mechanical properties of these adhesives still require improvement. Particularly significant properties in the production of structural adhesive bonds are tensile strength, tensile strain at break, and modulus of elasticity, and also shear strength. A particular requirement moreover in the structural adhesive bonding of blades for wind turbines is that the adhesive has a high softening point, since the structural adhesive bonds are exposed to elevated temperatures, for example due to insolation. Another factor that causes considerable heating, alongside insolation, is mechanical stress on the components: by way of example, German Lloyd requires that structural adhesives used in the construction of wind turbines are heat-resistant up to at least 65° C.

Another disadvantage of the adhesives of the prior art is a certain variation of mechanical properties from batch to batch. This is caused by slight changes in the composition of the natural material castor oil.

It was therefore an object of the present invention to provide a polyurethane adhesive which in the hardened state has very good mechanical properties, in particular tensile strength, tensile strain at break, modulus of elasticity, and shear strength, and which leads to adhesive bonds which have maximum uniformity from batch to batch. Another object of the present invention was to provide a polyurethane adhesive which has not only excellent mechanical properties in the hardened state but also a glass transition temperature above 60° C.

This object is achieved via a polyurethane adhesive comprising an isocyanate component A and a polyol component B where the isocyanate component A comprises at least one diisocyanate or polyisocyanate and the polyol component B comprises the alkoxylation product of a mixture of castor oil or ricinoleic acid (i), of an aromatic di- or polyol (ii), and of an OH-functional compound having aliphatically bonded OH groups and OH-functionality of from 1 to 8 (iii), and also optionally of a compound (iv), selected from the group consisting of cyclic anhydrides of dicarboxylic acids, and optionally of a compound (v) selected from the group consisting of cyclic mono- or diesters.

The polyisocyanate component A comprises at least one diisocyanate or polyisocyanate. These comprise all of the aliphatic, cycloaliphatic, and aromatic di- or polyfunctional isocyanates known for the production of polyurethanes, and also any desired mixtures thereof. Examples are diphenylmethane 4,4"-diisocyanate, diphenylmethane 2,4"-diisocyanate, the mixtures of monomeric diphenylmethane diisocyanates with diphenylmethane diisocyanate homologs having a larger number of rings (polymer MDI), tetramethylene diisocyanate, hexamethylene diisocyanate (HDI), mixtures of hexamethylene diisocyanates with oligomeric or polymeric homologs of hexamethylene diisocyanate (polynuclear HDI), isophorone diisocyanate (IPDI), tolylene 2,4- or 2,6-diisocyanate (TDI), and mixtures of these isocyanates. It is preferable to use tolylene diisocyanate (TDI), diphenylmethane diisocyanate (MDI), and in particular mixtures of diphenylmethane diisocyanate and polyphenylene polymethylene polyisocyanates. The isocyanates can also have been modified, for example via incorporation of uretdione, carbamate, isocyanurate, carbodiimide, allophanate, and in particular urethane groups.

Di- and polyisocyanates used here can also be isocyanate prepolymers containing isocyanate groups. These polyisocyanate prepolymers are obtainable by reacting di- and polyisocyanates described above, for example at temperatures of from 30 to 100° C., preferably at about 80° C., with polyols to give the prepolymer. It is preferable to produce the prepolymers of the invention by using 4,4'-MDI together with uretonimine-modified MDI and with commercially available polyols based on polyesters, for example deriving from adipic acid, or polyethers, for example deriving from ethylene oxide and/or propylene oxide.

Polyols that can be used for the production of isocyanate prepolymers are known to the person skilled in the art and are described by way of example in "Kunststoffhandbuch, Band 7, Polyurethane" [Plastics handbook, volume 7, Polyurethanes], Carl Hanser Verlag, 3rd edition 1993, chapter 3.1. It is preferable here that polyols used for the production of isocyanate prepolymers are those included in the description relating to polyol component B. In particular, no polyisocyanate prepolymers in polyisocyanate component A are used.

Di- and polyisocyanates used with particular preference are mixtures of diphenylmethane diisocyanate with polyphenylene polymethylene polyisocyanates.

The polyol component comprises the alkoxylation product of a mixture of castor oil or ricinoleic acid (i), of an aromatic di- or polyol (ii), and of an OH-functional compound having aliphatically bonded OH groups and OH-functionality of from 1 to 8 (iii), and also optionally of a compound (iv), selected from the group consisting of cyclic anhydrides of dicarboxylic acids, and optionally of a compound (v) selected from the group consisting of cyclic mono- or diesters.

This alkoxylation is preferably achieved in that the mixture of castor oil or ricinoleic acid (i), of an aromatic di- or polyol (ii), and of an OH-functional compound having aliphatically bonded OH groups and OH-functionality of from 1 to 8 (iii), and also optionally of a compound (iv), selected from the group consisting of cyclic anhydrides of dicarboxylic acids, and optionally of a compound (v) selected from the group consisting of cyclic mono- or diesters is alkoxylated with the aid of a nucleophilic and/or basic catalyst and of at least one alkylene oxide. It is preferable here that the mixture of components (i) to (iii) and optionally (iv) and (v) is used as initial charge in a reaction vessel before the alkylene oxide is added. By way of example, butylene 1,2-oxide, propylene oxide, or ethylene oxide can be used as alkylene oxide. It is preferable here that the alkylene oxide comprises propylene oxide, and it is particularly preferable here that the alkylene oxide consists of propylene oxide.

The basic and/or nucleophilic catalyst can be selected from the group consisting of alkali metal hydroxides and alkaline earth metal hydroxides, alkali metal alkoxides and alkaline earth metal alkoxides, tertiary amines, N-heterocyclic carbenes, and precursors of N-heterocyclic carbenes.

It is preferable that the basic and/or nucleophilic catalyst is selected from the group comprising tertiary amines.

It is particularly preferable that the basic and/or nucleophilic catalyst is selected from the group comprising imidazole and imidazole derivatives, very particular preference being given to imidazole.

In another preferred embodiment, the basic and/or nucleophilic catalyst is selected from the group comprising N-heterocyclic carbenes, particularly from the group comprising N-heterocyclic carbenes based on N-alkyl- and N-aryl-substituted imidazolylidenes.

In one preferred embodiment, the basic and/or nucleophilic catalyst is selected from the group comprising trimethylamine, triethylamine, tripropylamine, tributylamine, N,N'-dimethylethanolamine, N,N'-dimethylcyclohexylamine, dimethylethylamine, dimethylbutylamine, N,N'-dimethylaniline, 4-dimethylaminopyridine, N,N'-dimethylbenzylamine, pyridine, imidazole, N-methylimidazole, 2-methylimidazole, 1,2-dimethylimidazole, N-(3-aminopropyl)imidazole, 4-methylimidazole, 5-methylimidazole, 2-ethyl-4-methylimidazole, 2,4-dimethylimidazole, 1-hydroxypropylimidazole, 2,4,5-trimethylimidazole, 2-ethylimidazole, 2-ethyl-4-methylimidazole, N-phenylimidazole, 2-phenylimidazole, 4-phenylimidazole, guanidine, alkylated guanidine, 1,1,3,3-tetramethylguanidine, piperazine, alkylated piperazine, piperidine, alkylated piperidine, 7-methyl-1,5,7-triazabicyclo[4.4.0]dec-5-ene, 1,5-diazabicyclo[4.3.0]non-5-ene, 1,5-diazabicylo[5.4.0]undec-7-ene, preferably imidazole and dimethylethanolamine (DMEOA).

The catalysts mentioned can be used alone or in any desired mixture with one another.

The reaction with alkylene oxide is preferably achieved at temperatures in the range from 80 to 200° C., preferably from 100° C. to 160° C., particularly preferably from 110° C. to 150° C.

If tertiary amines and/or N-heterocyclic carbenes are used as catalysts for the reaction with alkylene oxides, the catalyst concentration, based on the mass of the compounds (i) to (iii) and, when present, (iv) and (v), is from 50 to 5000 ppm, preferably from 100 to 1000 ppm, and there is no need to remove the catalyst from the reaction product after the reaction.

Castor oil (i) is a renewable raw material and is obtained from the seeds of the castor oil plant. Castor oil is in essence a triglyceride of a fatty acid mixture comprising, based on the total weight of the fatty acid mixture, >75% by weight of ricinoleic acid, from 3 to 10% by weight of oleic acid, from 2 to 6% by weight of linoleic acid, from 1 to 4% by weight of stearic acid, from 0 to 2% by weight of palmitic acid, and also optionally small quantities, in each case less than 1% by weight, of other fatty acids such as linolenic acid, vaccenic acid, arachic acid, and eicosenoic acid. Alternatively, it is also possible to use ricinoleic acid to replace some castor oil. The proportion of ricinoleic acid here is preferably not more than 40% by weight, particularly preferably 20% by weight, more preferably 10% by weight, and in particular 5% by weight, based in each case on the total weight of component (i). The proportion of component (i) in the total weight of the mixture requiring alkoxylation is preferably from 30 to 90% by weight, particularly preferably from 40 to 85% by weight, and in particular from 45 to 80% by weight, based in each case on the total weight of components (i) to (iii) and, if present, (iv) and (v).

The mixture requiring alkoxylation can moreover comprise, in addition to castor oil and ricinoleic acid (i) other triglycerides of fatty acids, for example cod liver oil, tallow, soy oil, rapeseed oil, olive oil, sunflower oil, hydroxylated soy oil, palm oil, and derivatized castor oil, and also fatty acids derived from these triglycerides, or a mixture of these substances.

It is also possible to add hydroxylated oils to the mixture requiring alkoxylation. The modification of the oils, i.e. of the fatty acid triglycerides or of the fatty acids, can be achieved by way of the well-known processes, for example hydroformylation/hydrogenation or epoxidation/ring-opening, ozonolysis, direct oxidation, or N20 oxidation/reduction.

It is preferable that the proportion of castor oil and ricinoleic acid (i) in the total weight of the triglycerides and fatty acids comprised here in the mixture requiring alkoxylation is at least 50% by weight, particularly preferably at least 70% by weight, and in particular at least 80% by weight.

A compound comprising at least two aromatically bonded hydroxy groups is used as aromatic di- or polyol (ii). Alternatively, although less preferably, it is also possible to use as aromatic di- or polyol a di- or polyol obtained via alkoxylation of an aromatic di- or polyol. If an alkoxylation product of an aromatic polyol is used as component (ii), the hydroxy number of the aromatic di- or polyol must be greater than 350 mg KOH/g, preferably greater than 400 mg KOH/g, and particularly preferably greater than 450 mg KOH/g. It is preferable that the aromatic diol comprises at least two phenol groups, and it is particularly preferable that the aromatic diol (ii) comprises a bisphenol, and it is further preferable that the aromatic di- or polyol is a bisphenol.

Bisphenols are compounds having two hydroxyphenyl groups. These comprise bisphenol A (2,2-bis(4-hydroxyphenyl)propane); bisphenol AF (1,1-bis(4-hydroxyphenyl)-1-phenylethane), bisphenol AP (1,1-bis(4-hydroxyphenyl)-1-phenylethane), bisphenol B (2,2-bis(4-hydroxyphenyl) butane), bisphenol BP (bis(4-hydroxyphenyl) diphenylmethane), bisphenol C (2,2-bis(3-methyl-4-hydroxyphenyl)propane), bisphenol E (1,1-bis(4-hydroxyphenyl)ethane), bisphenol F (bis(4-hydroxyphenyl) methane), bisphenol FL (9,9-bis(4-hydroxyphenyl) fluorene), bisphenol G (2,2-bis(4-hydroxy-3-isopropylphenyl)propane), bisphenol M (1,3-bis(2-(4-hydroxyphenyl)-2-propyl)benzene), bisphenol P (1,4-bis(2-(4-hydroxyphenyl)-2-propyl)benzene), bisphenol PH (2,2-[5,5'-bis[1,1'-(biphenyl)-2-ol]]propane), bisphenol S (bis(4-hydroxyphenyl)sulfone), bisphenol TMC (1,1-bis(4-hydroxyphenyl)-3,3,5-trimethylcyclohexane), and bisphenol Z (1,1-bis(4-hydroxyphenyl)cyclohexane), particular preference being given to bisphenol A and bisphenol S, in particular bisphenol A.

In one particularly preferred embodiment the aromatic di- or polyol (ii) is bisphenol A or bisphenol S, in particular bisphenol A. The proportion of component (ii) in the total weight of the mixture requiring alkoxylation is preferably from 4 to 30% by weight, particularly preferably from 5 to 25% by weight, based in each case on the total weight of components (i) to (iii) and, if present, (iv) and (v).

Compounds that can be used as aliphatic OH-functional compound having aliphatically bonded OH groups and OH-functionality from 1 to 8 (iii) are compounds having from one to 8 aliphatically bonded hydroxy groups, but compounds covered by the definition of component (ii) are excluded as compounds of component (iii). Examples are water, propylene glycol, ethylene glycol, diethylene glycol, dipropylene glycol, neopentyl glycol, 1,2-butanediol, 1,3-butanediol, 1,4-butanediol, hexanediol, pentanediol, 3-methyl-1,5-pentanediol, 1,12-dodecanediol, monohydric alcohols such as ethanol and propanol, glycerol, trimethylolpropane, pentaerythritol, 1,2,4- or 1,3,5-trihydroxycyclohexane, sorbitol, and sucrose, and also reaction products of these compounds with alkylene oxides such as propylene oxide or ethylene oxide, and also mixtures thereof. Components (iii) can moreover also comprise polyesters and/or esters comprising OH groups. Esters and polyesters are preferably obtained from organic dicarboxylic acids having from 2 to 12 carbon atoms, preferably aliphatic dicarboxylic acids having from 4 to 6 carbon atoms, and from polyhydric alcohols, preferably diols, having from 2 to 12 carbon atoms, preferably from 2 to 6 carbon atoms. Examples of dicarboxylic acids that can be used are: succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids here can be used either individually or else in a mixture with one another. It is also possible to use, instead of the free dicarboxylic acids, the corresponding dicarboxylic acid derivatives, for example dicarboxylic esters of alcohols having from 1 to 4 carbon atoms or dicarboxylic anhydrides. It is preferable to use dicarboxylic acid mixtures of succinic, glutaric, and adipic acid, and in particular adipic acid. Examples of di- and polyhydric alcohols, in particular diols, are ethanediol, diethylene glycol, 1,2- and 1,3-propanediol, dipropylene glycol, 1,4-butanediol, 1,5-pentanediol, 1,6-hexanediol, 1,10-decanediol, glycerol, and trimethylolpropane. It is preferable to use ethanediol, diethylene glycol, 1,4-butanediol, 1,5-pentanediol, and 1,6-hexanediol. It is moreover possible to use polyester polyols made of lactones, for example ε-caprolactone, or hydroxycarboxylic acids, for example ω-hydroxycaproic acid. The ester or polyester is produced in a known manner.

The OH number of component (iii) here is at least 50 mg KOH/g, particularly preferably at least 200 mg KOH/g, and in particular at least 600 mg KOH/g. It is particularly preferable that compounds used as aliphatic polyol (iii) have from 5 to 8 OH groups. A particularly preferred example of a compound of component (iii) is a sugar, in particular sucrose or sorbitol, particularly preferably sucrose.

The proportion of component (iii) in the total weight of the mixture requiring alkoxylation is preferably from 2 to 40% by weight, particularly preferably from 3 to 25% by weight, and in particular from 4 to 20% by weight, based in each case on the total weight of components (i) to (iii) and, if present, (iv) and (v).

Compound (iv) which can optionally be used is a compound selected from the group consisting of cyclic anhydrides of dicarboxylic acids. Preference is given to the dicarboxylic anhydrides selected from the group comprising a) alkenylsuccinic anhydrides, b) phthalic anhydride, c) maleic anhydride, d) succinic anhydride, and e) tetrahydrophthalic anhydride, and mixtures thereof.

It is preferable here that the alkenylsuccinic anhydrides a) are selected from the group of the C12-C20-alkyl-chain-substituted succinic anhydrides and the poly(isobutylene) succinic anhydrides with molar mass of from 500 to 2000 g/mol. In an embodiment of the process of the invention, the at least one alkenylsuccinic anhydride a) is preferably selected from the group comprising C18- and/or C16-alkenylsuccinic anhydrides, poly(isobutylene)succinic anhydride, and mixtures thereof.

The proportion of component (iv) in the total weight of the mixture requiring alkoxylation is preferably from 0 to 30% by weight, particularly preferably from 2 to 25% by weight, and in particular from 4 to 20% by weight, based in each case on the total weight of components (i) to (iii) and, if present, (iv) and (v).

Compound (v) which can optionally be used is a compound selected from the group consisting of cyclic mono- and diesters. It is preferable here that the compound (v) is selected from the group comprising γ-butyrolactone, δ-valerolactone, ε-caprolactone, (R,R)-lactide, (S,S)-lactide, meso-lactide, and mixtures thereof; particular preference is given to ε-caprolactone as compound (v).

The proportion of component (v) in the total weight of the mixture requiring alkoxylation is preferably from 0 to 30% by weight, particularly preferably from 2 to 25% by weight, and in particular from 4 to 20% by weight, based in each case on the total weight of components (i) to (iii) and, if present, (iv) and (v).

It is usual to carry out the alkoxylation of the mixture of components (i) to (iii) and, if present, (iv) and (v) with the appropriate quantity of alkylene oxide until an OH number of from 80 to 800 mg KOH/g has been established, preferably from 150 to 600 mg KOH/g, and particular preferably from 200 to 500 mg KOH/g.

Alongside the alkoxylation product of component (i) to (iii) and, if present, (iv) and (v), it is also possible to use other compounds which have groups reactive toward isocyanate and which are conventionally used in polyurethane chemistry, for example polyols, chain extenders, and cross-linking agents. These are described by way of example in "Kunststoffhandbuch, Band 7, Polyurethane", Carl Hanser Verlag, 3. Auflage 1993, Kapitel 3.1 and 3.4.3, and specifically for polyurethane adhesive applications in "The polyurethanes book", Wiley, 2002, chapters 23 and 25. These preferably comprise exclusively OH groups as groups reactive toward isocyanate, and quantities used thereof are preferably less than 90% by weight, particularly preferably less than 50% by weight, more preferably less than 30% by weight, still more preferably less than 10% by weight, and in particular less than 1% by weight, based on the total weight of all of the compounds having groups reactive toward isocyanates in the polyol component B.

The polyurethane adhesives of the invention can also moreover receive additions of additives conventionally used during the production process, for example solvents, plasticizers, fillers, such as carbon blacks, chalks, and talcs, adhesion promoters, in particular silicon compounds, for example trialkoxysilanes, agents having thixotropic effect, for example amorphous silicas, and desiccants, for example zeolites. These additives are usually added to the polyol component of polyol component B.

The present invention further provides a process for adhesive bonding in which the isocyanate component A and the polyol component B of a polyurethane adhesive of the invention are mixed, the mixed polyurethane adhesive is applied to at least one substrate surface requiring adhesive bonding, a joint is formed between the substrate surfaces within the open time, and the polyurethane adhesive is allowed to harden. The mixing process here is preferably achieved with an isocyanate index of from 80 to 200, particularly from 90 to 150, more preferably from 95 to 120, and in particular from 98 to 110. For the purposes of the present invention, the isocyanate index is the stoichiometric ratio of isocyanate groups to groups reactive toward isocyanate, multiplied by 100.

It is preferable that an adhesive of the invention here has a long open time of at least 30 minutes at room temperature. The open time here is the period, starting from the mixing of polyisocyanate component A with polyol component B and subsequent application of the adhesive, during which it is still possible to form a join between the adherends, before the adhesive has hardened to the extent that it is no longer capable of forming an adhesive bond. The polyurethane adhesive of the invention can be used as structural adhesive, in particular for the adhesive bonding of plastics parts, preferably fiber-reinforced plastics parts. There are applications by way of example in vehicle construction, in aircraft construction, in particular aircraft wings, or in wind turbines, in particular rotor blades for wind turbines, and these feature excellent mechanical properties and high glass transition temperature together with long open time.

An advantage of the process of the invention is that when the alkoxylation product of components (i) to (v) is used it is possible to react compounds which feature a very large polarity difference and which in pure form are therefore incompatible with one another, and thus obtain a homogeneous reaction product. The reaction with alkylene oxide compatibilizes the mutually incompatible molecules, and homogeneous reaction products are obtained which include polyether units and also polyester units. One of the factors influencing this during the base-catalyzed alkoxylation reaction is that transesterification reactions take place simultaneously with ring-opening polymerization in the process, and ensure homogeneous distribution of the ester-bearing molecular chains with the ether-bearing molecular chains. This gives polyurethane adhesives with excellent processing properties and also excellent mechanical properties of the actual adhesive.

Examples will be used below to illustrate the invention.

Raw Materials Used:

Polyol 1: Sovermol® 805, a mixture of castor oil with a ketone resin in a mixing ratio of about 80/20 parts by weight with OH number 173 mg KOH/g, obtainable commercially from BASF SE Polyol 2: A sucrose/glycerol-containing propoxylate with OH number 490 mg KOH/g and with average functionality 4.3

Polyol 3: Propoxylate based on bisphenol A as starter with OH number 280 mg KOH/g.

Iso 1: Polymer MDI with functionality about 2.7 and with NCO content 31.5% by weight, obtainable with trademark Lupranat® M20 from BASF SE.

Water scavenger: Zeolitic water scavenger, dispersed in castor oil (50% by weight).

Polyol Synthesis Examples

Polyol Synthesis Example 1 (Synthesis 1):

175.2 g of glycerol, 0.5 g of imidazole, 275.45 g of sorbitol, and 425.1 g of bisphenol A, and 2751.7 g of castor oil (FSG quality) were charged at 25° C. to a 5 L reactor. This was then inertized with nitrogen. The vessel was heated to 150° C., and 1372.1 g of propylene oxide were added. After 11 h of reaction time, the system was evacuated at 100° C. for 40 minutes under maximum vacuum and then cooled to 25° C. This gave 4933 g of product.

The Properties of the Resultant Polyetherester were as Follows:

OH number: 300.2 mg KOH/g
Viscosity (25° C.): 2021 mPas
Acid number: less than 0.01 mg KOH/g
Water content: 0.02% by weight
Residual content of bisphenol A: less than 10 mg/kg determined by HPLC Polyol Synthesis Example 2 (Synthesis 2):

5.7 g of glycerol, 0.02 g of imidazole, 14.5 g of sorbitol, and 30.2 g of bisphenol A, and 122.4 g of castor oil (FSG quality) were charged at 25° C. to a 300 mL reactor. This was then inertized with nitrogen. The vessel was heated to 150° C., and 67.2 g of propylene oxide were added. After 19 h of reaction time, the system was evacuated at 100° C. for 40 minutes under maximum vacuum and then cooled to 25° C. This gave 225.9 g of product.

The Properties of the Resultant Polyetherester were as Follows:

OH number: 314.7 mg KOH/g
Average OH functionality 3.2
Viscosity (25° C.): 3170 mPas Acid number: less than 0.01 mg KOH/g
Water content: 0.04% by weight
Residual content of bisphenol A: less than 10 mg/kg determined by HPLC Polyol Synthesis Example 3 (Synthesis 3):

3.4 g of glycerol, 0.02 g of imidazole, 22.3 g of sucrose, and 36.0 g of bisphenol A, and 112.4 g of castor oil (FSG quality) were charged at 25° C. to a 300 mL reactor. This was then inertized with nitrogen. The vessel was heated to 130° C., and 65.9 g of propylene oxide were added. After 10 h of reaction time, the system was evacuated at 100° C. for 40 minutes under maximum vacuum and then cooled to 25° C. This gave 229.0 g of product.

The Properties of the Resultant Polyetherester were as Follows:

OH number: 310.6 mg KOH/g
Average OH functionality 3.4
Viscosity (25° C.): 7786 mPas
Acid number: less than 0.01 mg KOH/g
Water content: 0.04% by weight
Residual content of bisphenol A: less than 10 mg/kg determined by HPLC??

Polyol Synthesis Example 4 (Synthesis 4; Comparative Example Without Bisphenol A):

210.0 g of glycerol, 0.5 g of imidazole, 335.0 g of sorbitol, and 2749.7 g of castor oil (FSG quality) were charged at 25° C. to a 5000 mL reactor. This was then inertized with nitrogen. The vessel was heated to 150° C., and 1704.8 g of propylene oxide were added. After 4 h of reaction time, the system was evacuated at 100° C. for 60 minutes under maximum vacuum and then cooled to 25° C. This gave 4982.5 g of product.

The properties of the resultant polyetherester were as follows:

OH number: 308.9 mg KOH/g
Viscosity (25° C.): 1287 mPas
Acid number: less than 0.01 mg KOH/g
Water content: less than 0.01%

Adhesive Bonding and Production of a Sheet from the Same Reaction Mixture:

Adhesive Bonding:

The samples for determination of shear strength (shear strength at 0.5 mm) were produced with reference to DIN EN 1465 "Determination of tensile-lap-shear strength of bonded assemblies". For this, the starting materials as in Table 1 were mixed with isocyanate index 105 in a high-speed mixer for 90 sec at 1600 rpm and then for 30 sec at 2100 rpm. The adhesive was then applied to a glassfiber-reinforced epoxy sheet (Vetronit® EGS 619, 100×25×2 mm, Rocholl GmbH). The sheet, with applied adhesive, was then placed for 60 min in a cabinet under controlled climatic conditions at 25° C. and 70% humidity. A second sheet was placed onto this pretreated sheet. The thickness of the adhesive layer here is 0.5 mm. The adhesive bond is loaded with a weight of 1 kg until the adhesive has almost completely hardened. Residual adhesive is then removed, and the adhesive-bonded sheets are further hardened for 2 h at 80° C. The shear samples are cut to size in accordance with the standard DIN EN 1465, and tested.

Mechanical Properties of 2 mm and 4 mm Sheets

An open mold of the desired depth (2 mm or 4 mm) is preheated for about 45 min in a drying oven heated to 80° C. The evacuated components are weighed into the beaker of a high-speed mixer and mixed in the high-speed mixer 60 s at 1600 rpm and then for 120 s at 2100 rpm. After the stirring procedure has ended, the reaction mixture is charged to the mold and smoothed by a doctor. The sheet is hardened at 80° C. for 2 h. The test samples are then punched out from the resultant sheets. Mechanical properties are determined in accordance with DIN EN ISO 527 on test samples of thickness 2 mm, and glass transition temperature is determined by differential scanning calorimetry (DSC) at a heating rate of 20 K/min in accordance with DIN EN ISO 11357.

Determination of Open Time:

Open time is determined by measuring reaction viscosity in a rheometer with plate-on-plate geometry, with diameter 20 mm and gap width 1 mm. The reaction mixture for testing is produced by mixing the starting components as in Table 1 at an isocyanate index of 105 for 5 s at 1600 rpm in a high-speed mixer. Immediately thereafter, sufficient adhesive is applied to the test plate to fill the available space completely. Before the test, the sample is subjected to preshearing for 10 seconds with shear rate no more than 100 $s^{-1}$, and excess material is removed during the subsequent pause lasting 120 seconds. In the actual test, open time is determined as the time required to reach a viscosity of 400 Pas at a shear rate of $s^{-1}$.

TABLE 1

| | Example 1 | Example 2 | Example 3 | Comparison 1 | Comparison 2 | Comparison 3 | Comparison 4 |
|---|---|---|---|---|---|---|---|
| Synthesis 1 | 57.05 | | | | | | |
| Synthesis 2 | | 57.05 | | | | | |
| Synthesis 3 | | | 57.05 | | | | |
| Synthesis 4 | | | | 57.05 | 47.05 | | |
| Castor oil | | | | | | | 16.0 |
| Polyol 1 | | | | | | 28.55 | 31.3 |
| Polyol 2 | | | | | | 12.5 | 8.0 |
| Polyol 3 | | | | | 10.000 | 15.0 | 7.0 |
| Glycerol | | | | | | 1.0 | |
| Chalk | 33.0 | 33.0 | 32.6 | 33.0 | 33.0 | 33.0 | 22.0 |
| Fumed silica | 0.1 | 0.1 | 0.5 | 0.1 | 0.1 | 0.1 | 1.5 |
| 4,4-Methylene-bis(2,6-diethylaniline) | 1.8 | 1.8 | 1.8 | 1.8 | 1.8 | 1.8 | 2.2 |
| Antifoam | 0.05 | 0.05 | 0.05 | 0.05 | 0.05 | 0.05 | |
| Water scavenger | 8.0 | 8.0 | 8.0 | 8.0 | 8.0 | 8.0 | 12.0 |
| Isocyanate | Iso 1 | Iso 1 | Iso 1 | Iso 1 | Iso 1 | Iso 1 | Iso 1 |
| Open time (min) | 94 | 72 | 65 | 110 | 95 | 46 | 50 |
| Hardness after 2 h at 80° C. (Shore D) | 82 | 83 | 82 | 81 | 83 | 85 | 81 |
| Tensile strength (MPa) | 35.4 | 39.6 | 45 | 29.5 | 36.7 | 40.9 | 34.4 |

TABLE 1-continued

|  | Example 1 | Example 2 | Example 3 | Comparison 1 | Comparison 2 | Comparison 3 | Comparison 4 |
|---|---|---|---|---|---|---|---|
| Tensile strain at break (%) | 10 | 6 | 6 | 11 | 10 | 6 | 45 |
| Modulus of elasticity (MPa) | 3006 | 2567 | 2997 | 1686 | 2118 | 2648 | 1996 |
| $T_g$ (° C.) | 63 | 69 | 70 | n.d. | n.d. | 72 | 39 |
| Shear strength at 0.5 mm thickness (N/mm$^2$) | 11 | 12 | 15 | 4 | 1 | 7 | n.d. |

Table 1 shows that use of polyols of the invention gives adhesives with excellent properties, in particular with glass transition temperature above 60° C., shear strength above 10 N/mm$^2$, and high tensile strength above 35 MPa. The open time of adhesives of the invention here is more than 60 minutes, and therefore also permits adhesive bonding of large-surface-area structures, for example blades of wind turbines. In contrast to this, use of finished polyols based on bisphenol A, a pentafunctional starter, and castor oil, as described by way of example in EP 2468789, gives either glass transition temperatures that are too low (comparison 4) or shear strengths that are too low (comparison 3). Omission of bisphenol A in the synthesis polyol (comparison 1) or separate addition of bisphenol A polyol to a synthesis polyol without bisphenol A (comparison 2) also gives adhesives with inadequate shear strength values.

The invention claimed is:

1. A polyurethane adhesive comprising an isocyanate component A and a polyol component B,
   wherein:
   the isocyanate component A comprises a diisocyanate or a polyisocyanate, and
   the polyol component B comprises an alkoxylation product of a mixture comprising 30-90 wt. % of castor oil or ricinoleic acid (i), an aromatic di- or polyol (ii), and an OH-functional compound having aliphatically bonded OH groups and OH-functionality of from 1 to 8 (iii), and also optionally a compound (iv) that is a cyclic anhydride of a dicarboxylic acid, and optionally a compound (v) that is a cyclic mono- or diester,
   wherein wt. % is based on a total weight of components (i) to (iii) and, if present (iv) and (v).

2. The polyurethane adhesive according to claim 1, wherein said alkoxylation product is achieved with the aid of a nucleophilic and/or basic catalyst and of at least one alkylene oxide.

3. The polyurethane adhesive according to claim 2, wherein the alkylene oxide comprises propylene oxide.

4. The polyurethane adhesive according to claim 1, wherein the mixture comprises an aromatic diol comprising two phenol groups.

5. The polyurethane adhesive according to claim 4, wherein the aromatic diol comprises a bisphenol.

6. The polyurethane adhesive according to claim 1, wherein the OH-functional compound (iii) has from 5 to 8 OH groups.

7. The polyurethane adhesive according to claim 1, wherein the isocyanate component A comprises a mixture of monomeric diphenylmethane diisocyanate and of diphenylmethane diisocyanate having a larger number of rings than monomeric diphenylmethane diisocyanate.

8. The polyurethane adhesive according to claim 1, wherein the OH number of the alkoxylation product is in the range from 80 to 800.

9. The polyurethane adhesive according to claim 1, wherein the proportion of castor oil or ricinoleic acid (i) is from 30 to 80% by weight, the proportion of an aromatic di- or polyol (ii) is from 4 to 25% by weight, and the proportion of an OH-functional compound having aliphatically bonded OH groups and OH-functionality of from 1 to 8 (iii) is from 10 to 40% by weight, and the proportion of an optional compound (iv) that is a cyclic anhydride of a dicarboxylic acid is from 0 to 30% by weight, and the proportion of an optional compound (v) that is a cyclic mono- or diester is from 0 to 30% by weight, based in each case on the total weight of components (i) to (v).

10. The polyurethane adhesive according to claim 1, wherein the mixture comprises the compound (iv).

11. The polyurethane adhesive according to claim 1, wherein the mixture comprises the compound (v).

12. The polyurethane adhesive according to claim 1, wherein the mixture comprises the compound (iv) and the compound (v).

13. The polyurethane adhesive according to claim 1, wherein said polyol component B excludes castor oil.

14. A process for adhesive bonding, comprising:
   mixing the isocyanate component A and the polyol component B of the polyurethane adhesive according to claim 1,
   applying the mixed polyurethane adhesive to at least one substrate surface requiring adhesive bonding,
   forming a joint within an open time, and
   hardening the polyurethane adhesive.

15. The process according to claim 14, wherein the at least one substrate surface requiring adhesive bonding is a plastic.

16. An adhesive-bonded item obtained by the process according to claim 14.

17. A wind turbine comprising the adhesive-bonded item according to claim 16.

* * * * *

UNITED STATES PATENT AND TRADEMARK OFFICE
CERTIFICATE OF CORRECTION

PATENT NO. : 9,567,500 B2
APPLICATION NO. : 14/901138
DATED : February 14, 2017
INVENTOR(S) : Berend Eling et al.

It is certified that error appears in the above-identified patent and that said Letters Patent is hereby corrected as shown below:

On the Title Page

Item (73), the Assignee's Information is incorrect. Item (73) should read:

-- (73) Assignee: BASF SE, Ludwigshafen (DE) --

Signed and Sealed this
Tenth Day of April, 2018

Andrei Iancu
*Director of the United States Patent and Trademark Office*